(12) United States Patent
Mordechai (10) Patent No.: US 11,838,675 B2
(45) Date of Patent: Dec. 5, 2023

(54) DEPTH IMAGING CAMERA WITH POLARIZATION-CODED APERTURE

(71) Applicant: GM Global Technology Operations LLC, Detroit, MI (US)

(72) Inventor: Emanuel Mordechai, Mishmarot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 257 days.

(21) Appl. No.: 17/182,695

(22) Filed: Feb. 23, 2021

(65) Prior Publication Data

US 2022/0272234 A1 Aug. 25, 2022

(51) Int. Cl.
| | |
|---|---|
| *H04N 5/222* | (2006.01) |
| *G01S 17/931* | (2020.01) |
| *G01S 17/89* | (2020.01) |
| *G02B 5/30* | (2006.01) |
| *H04N 23/80* | (2023.01) |

(52) U.S. Cl.
CPC ............ *H04N 5/2226* (2013.01); *G01S 17/89* (2013.01); *G01S 17/931* (2020.01); *G02B 5/3025* (2013.01); *H04N 23/80* (2023.01)

(58) Field of Classification Search
CPC .............. H04N 5/2226; H04N 5/23229; G01S 17/931; G01S 17/89; G02B 5/3025
See application file for complete search history.

(56) References Cited

U.S. PATENT DOCUMENTS

| 8,345,144 B1 * | 1/2013 | Georgiev ............. H04N 9/0451 |
| | | 359/368 |
| 2021/0055389 A1 * | 2/2021 | Mordechai .............. G01S 17/14 |

OTHER PUBLICATIONS

Lee et al., "Single Image-Based Depth Estimation Using Dual Off-Axis Color Filtered Aperture Camera", International Conference on Acoustics, Speech, and Signal Processing, 1988, Oct. 2013, pp. 1-6.

* cited by examiner

*Primary Examiner* — Twyler L Haskins
*Assistant Examiner* — Fayez A Bhuiyan
(74) *Attorney, Agent, or Firm* — CANTOR COLBURN LLP (57) ABSTRACT

A depth imaging system in a vehicle includes a lens that includes a polarization-coded aperture. The polarization-coded aperture includes a perpendicular polarization portion to pass incident light entering the perpendicular polarization portion of the polarization-coded aperture as perpendicularly polarized light. The polarization-coded aperture also includes a parallel polarization portion to pass the incident light entering the parallel polarization portion of the polarization-coded aperture as parallel polarized light. An image sensor provides a perpendicularly polarized image based on the perpendicularly polarized light and a parallel polarized image based on the parallel polarized light. A controller processes the perpendicularly polarized image and the parallel polarized image to identify one or more objects in a field of view of the depth imaging system and to determine a range to each of the one or more objects.

20 Claims, 6 Drawing Sheets

FIG. 6A

DEPTH IMAGING CAMERA WITH POLARIZATION-CODED APERTURE

INTRODUCTION

The subject disclosure relates to a depth imaging camera with a polarization-coded aperture.

Vehicles (e.g., automobiles, trucks, constructions equipment, farm equipment, automated factory equipment) increasingly use sensors to obtain information about the vehicle and its surroundings. The information may be used to control one or more aspects of vehicle operation. Exemplary sensors that obtain information about the environment outside the vehicle include cameras, light detection and ranging (lidar) systems, and radio detection and ranging (radar) systems. Lidars and depth imagers provide the depth to an object (i.e., range from the vehicle to the object), but they also have drawbacks. Accordingly, it is desirable to provide a depth imaging camera with a polarization-coded aperture.

SUMMARY

In one exemplary embodiment, a depth imaging system in a vehicle includes a lens that includes a polarization-coded aperture. The polarization-coded aperture includes a perpendicular polarization portion to pass incident light entering the perpendicular polarization portion of the polarization-coded aperture as perpendicularly polarized light, and a parallel polarization portion configured to pass the incident light entering the parallel polarization portion of the polarization-coded aperture as parallel polarized light. An image sensor provides a perpendicularly polarized image based on the perpendicularly polarized light and a parallel polarized image based on the parallel polarized light. A controller processes the perpendicularly polarized image and the parallel polarized image to identify one or more objects in a field of view of the depth imaging system and to determine a range to each of the one or more objects.

In addition to one or more of the features described herein, the polarization-coded aperture further comprises an obscuration portion configured to block the incident light that encounters the obscuration portion of the polarization-coded aperture.

In addition to one or more of the features described herein, the depth imaging system also includes a filter array corresponding with the image sensor, wherein the filter array is a pixelated array of filter pixels, the image sensor is a pixelated array of sensor pixels, and each of the filter pixels corresponds with one of the sensor pixels.

In addition to one or more of the features described herein, the filter array is overlaid on the image sensor and is between the polarization-coded aperture and the image sensor.

In addition to one or more of the features described herein, the filter pixels are formed as a repeating pattern that includes perpendicularly polarized filters that pass only the perpendicularly polarized light to corresponding ones of the sensor pixels and also includes parallel polarized filters that pass only the parallel polarized light to corresponding ones of the sensor pixels.

In addition to one or more of the features described herein, the polarization-coded aperture further comprises a clear portion to pass the incident light entering the clear portion of the polarization-coded aperture as red light and blue light.

In addition to one or more of the features described herein, the perpendicularly polarized light is green light and the parallel polarized light is green light.

In addition to one or more of the features described herein, the filter pixels are formed as a repeating pattern that includes perpendicularly polarized filters that pass only the perpendicularly polarized light that is the green light to corresponding ones of the sensor pixels, parallel polarized filters that pass only the parallel polarized light that is the green light to corresponding ones of the sensor pixels, red filters that pass only the red light to corresponding ones of the sensor pixels, and blue filters that pass only the blue light to corresponding ones of the sensor pixels.

In addition to one or more of the features described herein, the image sensor provides an unpolarized color image based on the red light and the blue light.

In addition to one or more of the features described herein, the controller controls an operation of the vehicle based on the range to each of the one or more objects.

In another exemplary embodiment, a method of assembling a depth imaging system in a vehicle includes obtaining a lens that includes a polarization-coded aperture with a perpendicular polarization portion to pass the incident light entering the perpendicular polarization portion of the polarization-coded aperture as perpendicularly polarized light, and a parallel polarization portion to pass the incident light entering the parallel polarization portion of the polarization-coded aperture as parallel polarized light. The method also includes positioning the polarization-coded aperture to receive incident light from a field of view and arranging an image sensor to provide a perpendicularly polarized image based on the perpendicularly polarized light and a parallel polarized image based on the parallel polarized light. A controller is configured to process the perpendicularly polarized image and the parallel polarized image to identify one or more objects in a field of view of the depth imaging system and to determine a range to each of the one or more objects.

In addition to one or more of the features described herein, the obtaining includes the polarization-coded aperture including an obscuration portion configured to block the incident light that encounters the obscuration portion of the polarization-coded aperture.

In addition to one or more of the features described herein, the method also includes obtaining a filter array corresponding with the image sensor, wherein the filter array is a pixelated array of filter pixels, the image sensor is a pixelated array of sensor pixels, and each of the filter pixels corresponds with one of the sensor pixels.

In addition to one or more of the features described herein, the method also includes overlaying the filter array on the image sensor and between the polarization-coded aperture and the image sensor.

In addition to one or more of the features described herein, the obtaining the filter array includes the filter pixels being formed as a repeating pattern that includes perpendicularly polarized filters that pass only the perpendicularly polarized light to corresponding ones of the sensor pixels and also includes parallel polarized filters that pass only the parallel polarized light to corresponding ones of the sensor pixels.

In addition to one or more of the features described herein, the obtaining the polarization-coded aperture further comprises the polarization-coded aperture including a clear portion configured to pass the incident light entering the clear portion of the polarization-coded aperture as red light and blue light.

In addition to one or more of the features described herein, the perpendicularly polarized light is green light and the parallel polarized light is green light.

In addition to one or more of the features described herein, the obtaining the filter array includes the filter pixels being formed as a repeating pattern that includes perpendicularly polarized filters that pass only the perpendicularly polarized light that is the green light to corresponding ones of the sensor pixels, parallel polarized filters that pass only the parallel polarized light that is the green light to corresponding ones of the sensor pixels, red filters that pass only the red light to corresponding ones of the sensor pixels, and blue filters that pass only the blue light to corresponding ones of the sensor pixels.

In addition to one or more of the features described herein, the arranging the image sensor includes configuring the image sensor to provide an unpolarized color image based on the red light and the blue light.

In addition to one or more of the features described herein, the configuring the controller further comprises configuring the controller to control an operation of the vehicle based on the range to each of the one or more objects.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

As previously noted, a lidar is an exemplary sensor that provides an image from which the depth of an object in the image may be obtained. This depth indicates the range to the object from the vehicle. However, the depth determination has limited resolution, requires the cost and weight associated with components such as the laser light source, and is computationally expensive. Another approach to depth imaging involves stereo cameras (i.e., two or more cameras that obtain images from a common field of view). However, this approach not only requires multiple cameras but alignment and calibration of the alignment between the cameras.

Embodiments of the systems and methods detailed herein relate to a depth imaging camera with a polarization-coded aperture. A single camera is used with an aperture that has dual off-axis polarization-coded areas. The aperture of a camera, as generally understood, is the open (i.e., exposed) portion of a lens through which light enters the camera. The aperture may make up some or all of the lens. According to one or more embodiments, the lens includes an aperture (i.e., the portion of the lens through which light enters) that is polarization-coded. One of the polarization-coded portions of the aperture has parallel polarization such that light with any other polarization is not passed through that portion of the aperture to the image sensor. The other of the polarization-coded portions of the aperture has perpendicular polarization such that light with any other polarization is not passed through that portion of the aperture. As detailed, the image sensor determines the range to each object in the image obtained with the camera based on the disparity between the images obtained via the two differently coded portions of the aperture.

Figure 1:
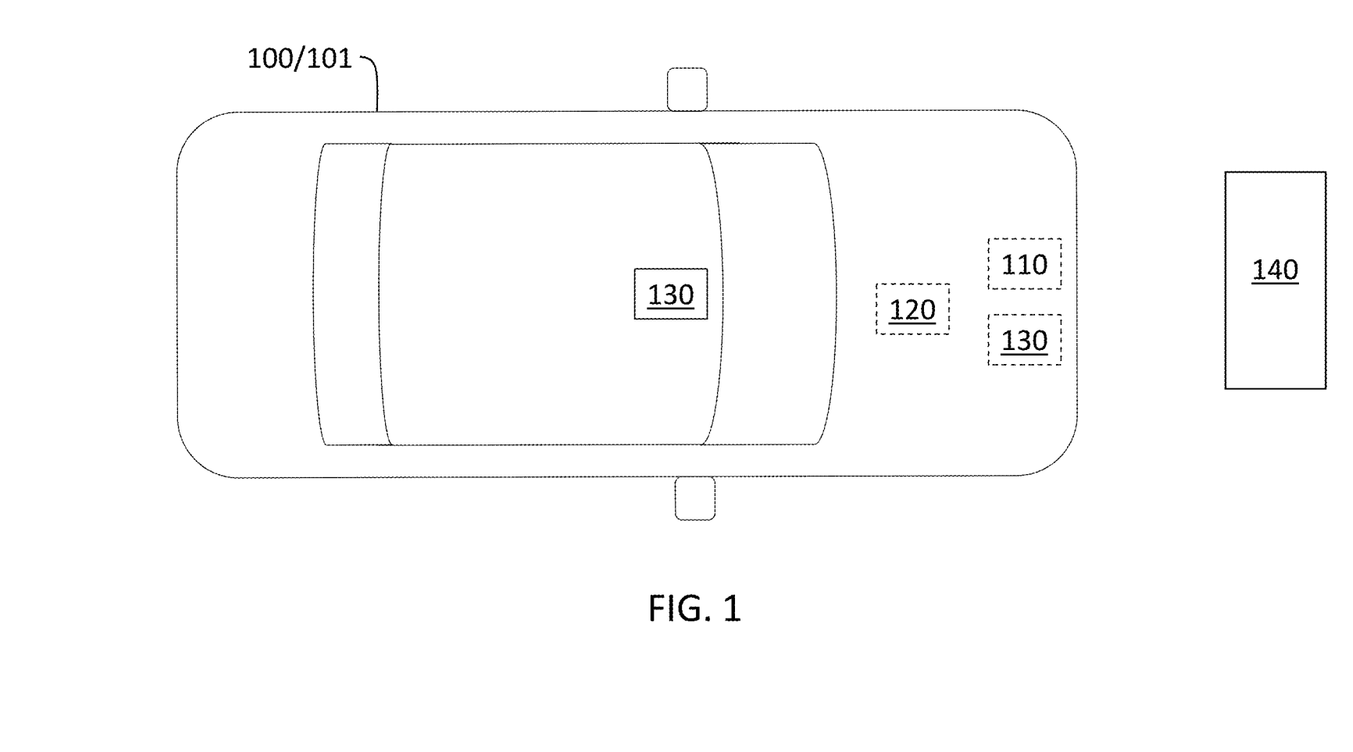
FIG. 1 is a block diagram of a vehicle that includes a depth imaging camera with a polarization-coded aperture.
Figure 2:
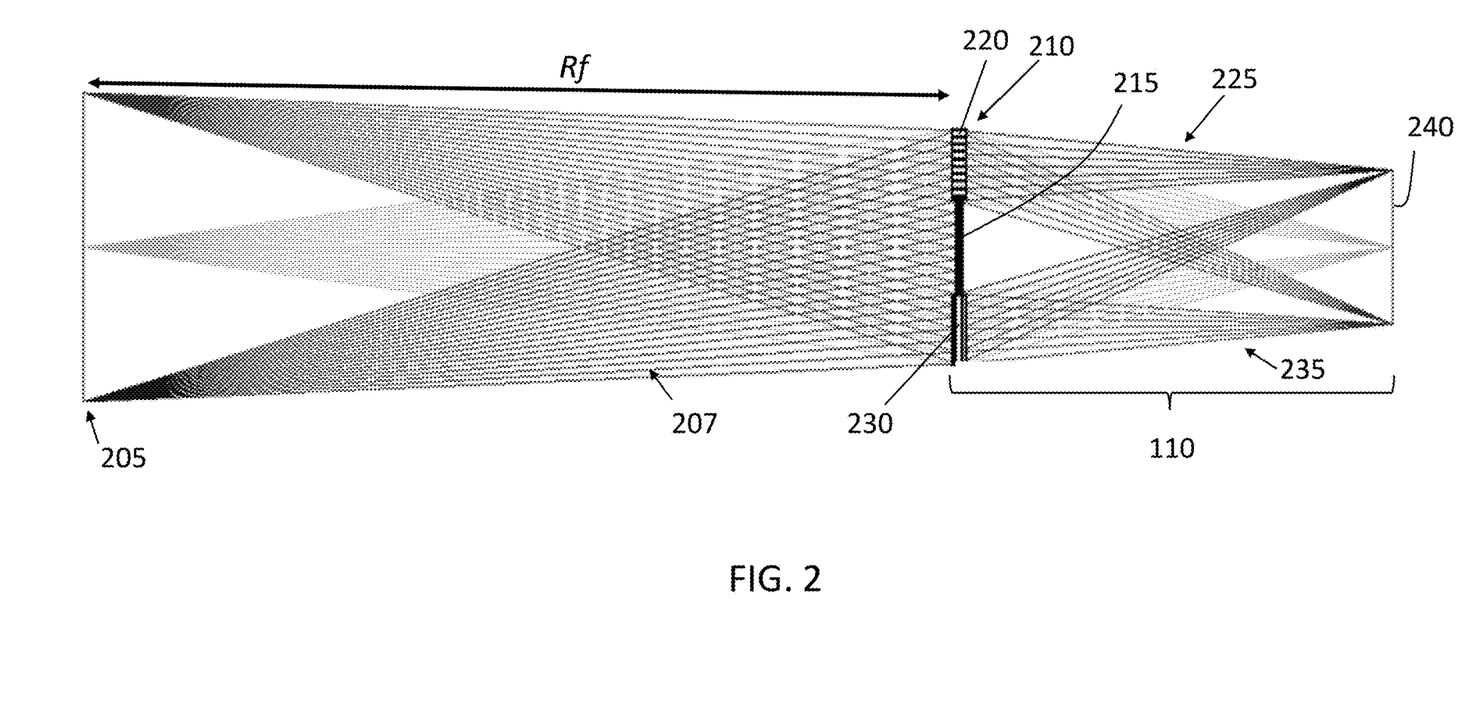
FIG. 2 details aspects of a depth imaging camera with a polarization-coded aperture according to one or more embodiments.

In accordance with an exemplary embodiment, FIG. 1 is a block diagram of a vehicle 100 that includes a depth imaging camera 110 with a polarization-coded aperture 210 (FIG. 2). The exemplary vehicle 100 shown in FIG. 1 is an automobile 101. In addition to the depth imaging camera 110, the vehicle 100 includes other sensors 130 (e.g., radar system, lidar system) that obtain information about the environment around the vehicle 100. The numbers and locations of the depth imaging camera 110 and other sensors 130 within the vehicle 100 are not intended to be limited by the exemplary illustration in FIG. 1. The vehicle 100 also includes a controller 120 that obtains information from the camera 110 and one or more other sensors 130 and controls an operation of the vehicle 100 based on the information. Exemplary applications of the information include collision avoidance, automated braking, adaptive cruise control, and autonomous driving.

The information that the controller 120 obtains from the depth imaging camera 110 may include identification of one or more objects 140 captured in an image obtained with the depth imaging camera 110. The object identification may be based on image processing by the controller 120. As detailed, the controller 120 may also obtain depth information (i.e., a range to each of the identified objects 140) from the image of the depth imaging camera 110. The controller 120 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

FIG. 2 details aspects of a depth imaging camera 110 with a polarization-coded aperture 210 according to one or more embodiments. Generally, the depth imaging camera 110 includes the polarization-coded aperture 210 and an image sensor 240. An exemplary object plane 205 is indicated in FIG. 2. The exemplary object plane 205 is at a range Rf from the polarization-coded aperture 210 that is in focus. This exemplary object plane 205 is one of many object planes 205 within a field of view of the depth imaging camera 110 from which light 207 is directed toward the polarization-coded aperture 210. That is, while only the light 207 from the exemplary object plane 205 is shown for explanatory purposes, light 207 enters the polarization-coded aperture 210 from each of the object planes 205. The light 207 is unpolarized.

At the polarization-coded aperture 210, a perpendicular polarization portion 220 and a parallel polarization portion 230 polarize the light 207 into orthogonal polarization states. That is, the perpendicular polarization portion 220 polarizes the incoming light 207 with a perpendicular polarization to generate perpendicularly polarized light 225 and the parallel polarization portion 230 polarizes the incoming light 207 with a parallel polarization to general parallel polarized light 235. The perpendicular polarization portion 220 and the parallel polarization portion 230 are located off-axis from each other. Thus, the polarization-coded aperture 210 includes dual off-axis polarization-coded areas. The remainder of the polarization coded aperture 210 includes an optional obscuration portion 215, which prevents the light 207 from passing through. The polarization-coded aperture 210 and the image sensor 240 are further detailed with reference to FIGS. 4 and 5.

As previously noted, the exemplary object plane 205 shown in FIG. 2 is at a focus range Rf of the depth imaging camera 110. As such, both the perpendicularly polarized light 225 and the parallel polarized light 235 resulting from incoming light 207 that originates at a same point in the exemplary object plane 205 encounters the image sensor 240 at the same point. As FIGS. 3A and 3B indicate, this is not the case when the range R of a given object plane 205 is less than or greater than the focus range Rf. As discussed with reference to FIG. 5, this fact is used to obtain two images 520, 530 (FIG. 5) based on overlaying a filter array 510 (FIG. 5) on the image sensor 240. Thus, using the polarization-coded aperture 210 of the depth imaging camera 110, a perpendicularly polarized image 520 associated with the perpendicularly polarized light 225 and a parallel polarized image 530 associated with the parallel polarized light 235 are obtained. A disparity map 540 (FIG. 5) is then obtained from the two images 520, 530 to facilitate depth determination. This disparity map 540 is similar to one obtained in a stereo camera approach but does not require obtaining images with two separate cameras (i.e., separate image sensors).

Figure 3A:
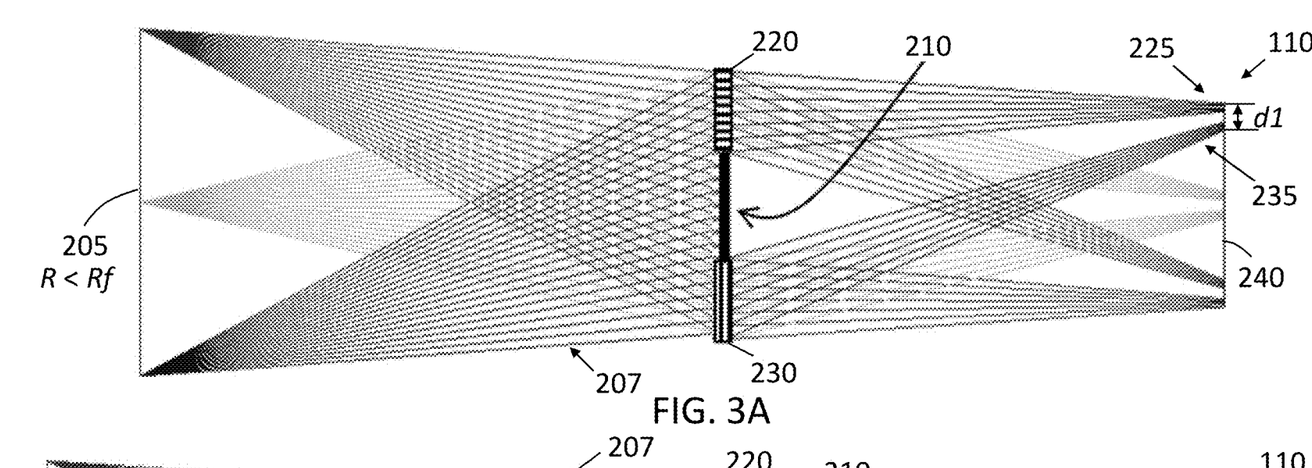
FIG. 3A shows aspects of a depth imaging camera with a polarization-coded aperture according to one or more embodiments.
Figure 3B:
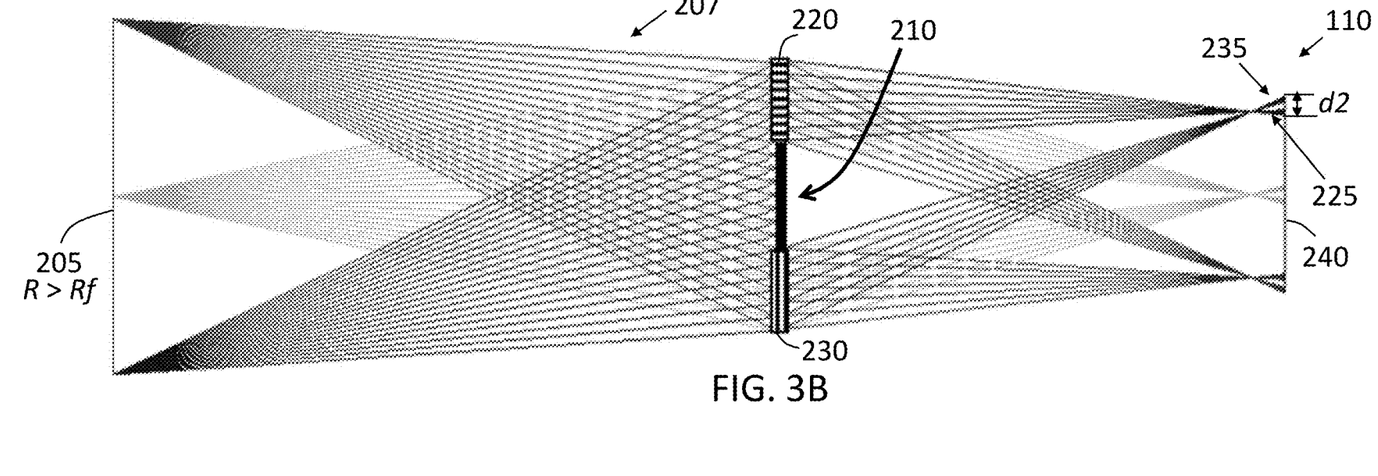
FIG. 3B shows aspects of a depth imaging camera with a polarization-coded aperture according to one or more embodiments.

FIGS. 3A and 3B illustrate the results, at the image sensor 240, for two exemplary object planes 205. FIG. 3A shows aspects of a depth imaging camera 110 with a polarization-coded aperture 210 according to one or more embodiments. Light 207 entering the polarization-coded aperture 210 is from an exemplary object plane 205 that is at a range R that is less (i.e., closer to the depth imaging camera 110) than the focus range Rf. Comparing the input to the image sensor 240 in FIG. 3A with that shown in FIG. 2, the perpendicularly polarized light 225 and the parallel polarized light 235 do not meet at the same point of the image sensor 240 in FIG. 3A. Instead, the light 207 from a given point in the exemplary object plane 205 is projected, as perpendicularly polarized light 225 and the parallel polarized light 235, to separated points (e.g., pixels 517 (FIG. 5)) of the image processor 240. The relative position of the portions 220, 230 is maintained for the projections. That is, as shown in FIG. 3A, the perpendicular polarization portion 220 is above the parallel polarization portion 230 of the polarization-coded aperture 210. Thus, for a point from a range R that is less than Rf, the perpendicularly polarized light 225 is projected above the parallel polarized light 235 on the image sensor 240. The distance d1 between the projections increases as the range R decreases.

FIG. 3B shows aspects of a depth imaging camera 110 with a polarization-coded aperture 210 according to one or more embodiments. Light 207 entering the polarization-coded aperture 210 is from an exemplary object plane 205 that is at a range R that is greater (i.e., farther from the depth imaging camera 110) than the focus range Rf. Comparing the input to the image sensor 240 in FIG. 3B with that shown in FIG. 2, the perpendicularly polarized light 225 and the parallel polarized light 235 do not meet at the same point of the image sensor 240 in FIG. 3B. Instead, the light 207 from a given point in the exemplary object plane 205 is projected, as perpendicularly polarized light 225 and the parallel polarized light 235, to separated points (e.g., pixels 517) of the image processor 240.

Unlike the scenario illustrated in FIG. 3A, the relative position of the portions 220 (e.g., perpendicular polarization portion 220 above the parallel polarization portion 230 of the polarization-coded aperture 210 according to the view shown) is not maintained for the projections. Instead, in the exemplary arrangement, the perpendicularly polarized light 225 is projected below the parallel polarized light 235 from the same point of the exemplary object plane 205. The distance d2 between the projections increases as the range R increases. This difference in the relative projections of the perpendicularly polarized light 225 and the parallel polarized light 235 based on the range R of the object plane 205 relative to the focus range Rf indicates whether distance d1 or distance d2 is relevant. Then, the distance d1 or d2 facilitates determining the range R to a detected object 140, as discussed with reference to FIG. 5.

Figure 4A:
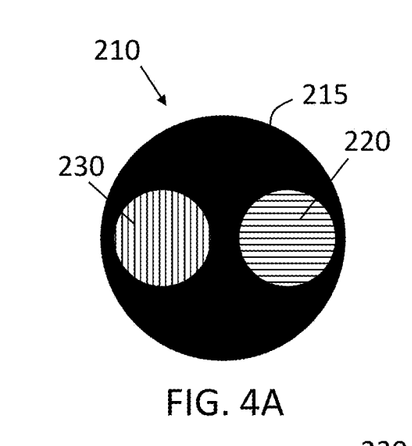
FIG. 4A shows an exemplary polarization-coded aperture of the depth imaging camera according to one or more embodiments.

FIGS. 4A, 4B, 4C, 4D show exemplary embodiments of the polarization-coded aperture 210 of the depth imaging camera 110. The examples shown are not intended to limit the polarization-coded aperture 210 according to alternate embodiments. FIG. 4A shows an exemplary polarization-coded aperture 210 of the depth imaging camera 110 according to one or more embodiments. The perpendicular polarization portion 220 and the parallel polarization portion 230 are indicated. An optical obscuration portion 215 makes up the remainder of the polarization-coded aperture 210. Thus, light 207 only passes through the perpendicular polarization portion 220 and the parallel polarization portion 230 to the image sensor 240.

Figure 4B:
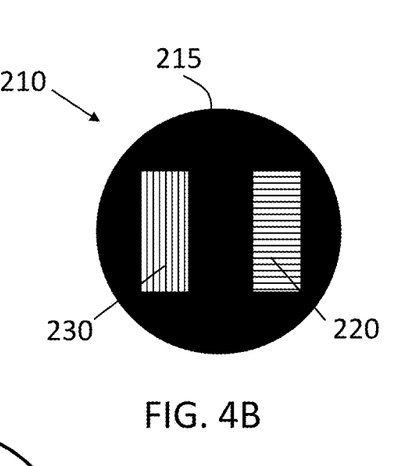
FIG. 4B shows an exemplary polarization-coded aperture of the depth imaging camera according to one or more embodiments.

FIG. 4B shows an exemplary polarization-coded aperture 210 of the depth imaging camera 110 according to one or more embodiments. Like the embodiment shown in FIG. 4A, the embodiment shown in FIG. 4B depicts a polarization-coded aperture 210 with a perpendicular polarization portion 220 and a parallel polarization portion 230, with an optical obscuration portion 215 making up the remainder of the polarization-coded aperture 210.

Figure 4C:
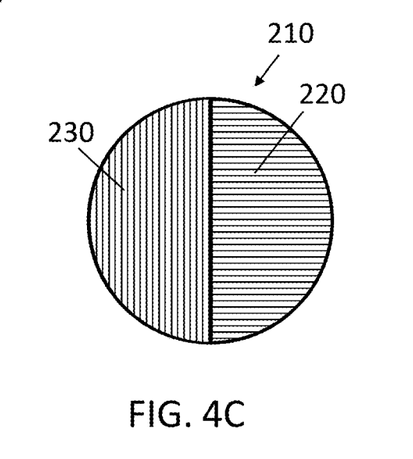
FIG. 4C shows an exemplary polarization-coded aperture of the depth imaging camera according to one or more embodiments.

FIG. 4C shows an exemplary polarization-coded aperture 210 of the depth imaging camera 110 according to one or more embodiments. As indicated, the polarization-coded aperture 210 is divided into either a perpendicular polarization portion 220 or a parallel polarization portion 230.

Figure 4D:
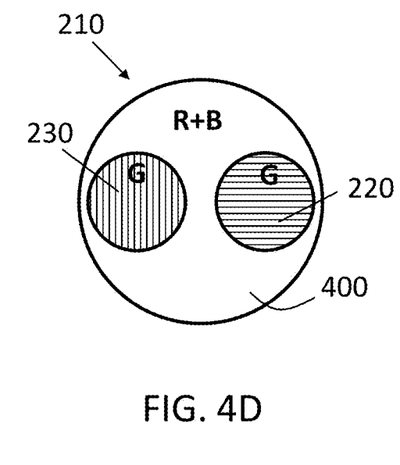
FIG. 4D shows an exemplary polarization-coded aperture of the depth imaging camera according to one or more embodiments.

FIG. 4D shows an exemplary polarization-coded aperture 210 of the depth imaging camera 110 according to one or more embodiments. While the polarization-coded apertures 210 shown in FIGS. 4A, 4B, and 4C pertain to a monochromatic depth imaging camera 110, the polarization-coded aperture 210 shown in FIG. 4D pertains to a color imager. A clear portion 400 of the polarization-coded aperture 210 blocks light 207 at a wavelength corresponding with green G and passes light 207 corresponding with red R and blue B. The green portions of the light 207 pass through a perpendicular polarization portion 220 or a parallel polarization portion 230.

Figure 5:
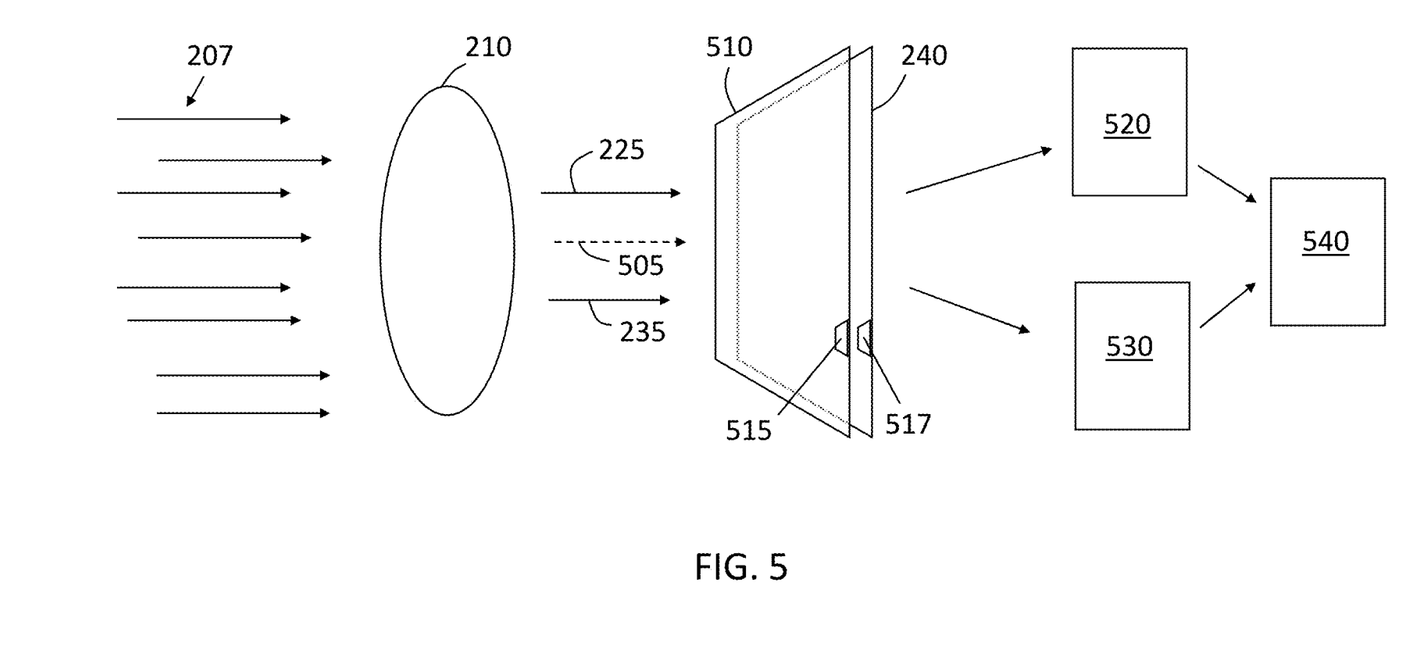
FIG. 5 illustrates a process flow using a polarization-coded aperture in a depth imaging camera according to one or more embodiments.

FIG. 5 illustrates a process flow using a polarization-coded aperture 210 in a depth imaging camera 110 according to one or more embodiments. As previously noted, light 207 from object planes 205 within the field of view of the depth imaging camera 110 enters the polarization-coded aperture 210. As shown in FIGS. 4A through 4D, the polarization-coded aperture 210 includes a perpendicular polarization portion 220 and a parallel polarization portion 230 that may be shaped, sized, and arranged according to any number of exemplary embodiments. In addition, the polarization-coded aperture 210 may include an optical obscuration portion 215 to block the passage of light 207 or a color filter (e.g., clear portion 400) such that the perpendicular polarization portion 220 and the parallel polarization portion 230 only pertain to one color (e.g., green G). Thus, the polarization-coded aperture 210 provides perpendicularly polarized light 225 and parallel polarized light 235 and may additionally provide other light 505 (e.g., based on the clear portion 400).

Figure 6A:
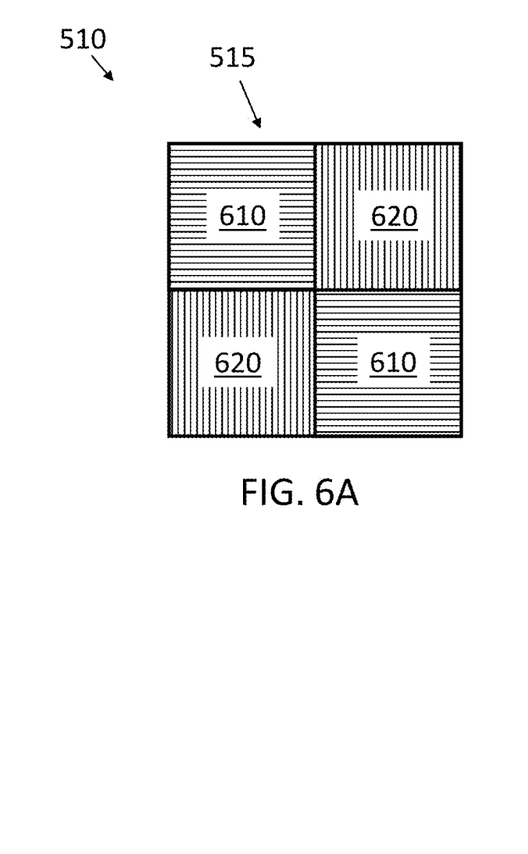
FIG. 6A shows a filter pattern of an exemplary filter array used in a depth imaging camera according to one or more embodiments.
Figure 6B:
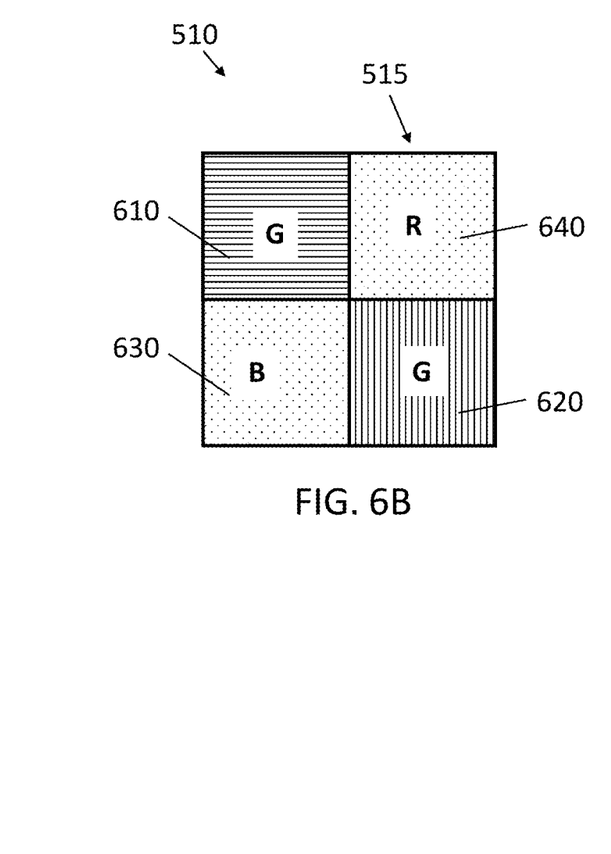
FIG. 6B shows a filter pattern of an exemplary filter array used in a depth imaging camera according to one or more embodiments.

A filter array 510 is shown corresponding with the image sensor 240. The image sensor 240 is a pixelated array of light detectors. One of the pixels 517 is indicated. Each pixel 515 of the filter array 510 corresponds with a pixel 517 of the image sensor 240. For example, the image sensor 240 may be a complementary metal-oxide-semiconductor (CMOS) image sensor that converts photons to electrons to facilitate digital image processing of the resulting pixels 517. The filter array 510 is also pixelated to facilitate filtering of each pixel. One of the pixels 515 is indicated. As further discussed with reference to FIG. 6, the filter array 510 facilitates separation of a perpendicularly polarized image 520 and a parallel polarized image 530 corresponding, respectively, with the perpendicularly polarized light 225 and the parallel polarized light 235 produced by the polarization-coded aperture 210.

The controller 120 obtains the perpendicularly polarized image 520 and the parallel polarized image 530 and a disparity map 540. The controller 120 first performs image processing to identify one or more objects 140 in the images 520, 530. The controller 120 then indicates the distance d1 or d2 between each part of each object 140 in the perpendicularly polarized image 520 and the same part in the parallel polarized image 530 as the disparity map 540. As previously noted, a prior approach to obtaining a disparity map involves two separate image sensors that have a common field of view and that are aligned.

As discussed with reference to FIGS. 3A and 3B, the relative position of the projection of the same part of an object 140 in the two images 520, 530 indicates whether the range R is less than or greater than the focus range Rf. That is, if the relative position of the projections maintains the relative position of the perpendicularly polarized portion 220 and the parallel polarized portion 230, then the range R is less than the focus range Rf. If the relative position of the projections does not maintain the relative position of the perpendicularly polarized portion 220 and the parallel polarized portion 230, then the range R is greater than the focus range Rf. Then the value of the distance d1 (in the case of R<Rf) or d2 (in the case of R>Rf) indicates the value of the range R by indicating the distance from the known focus range Rf. That is, the range R is the focus range Rf with d1 subtracted when R<Rf and the range R is the focus range Rf with d2 added when R>Rf. In this manner, the range R to each object 140 in the field of view of the depth imaging camera 110 may be determined based on the disparity map 540.

FIGS. 6A and 6B show exemplary embodiments of aspects of the filter array 510 used in a depth imaging camera 110 according to one or more embodiments. FIG. 6A shows a filter pattern of an exemplary filter array 510 used in a depth imaging camera 110 according to one or more embodiments. As previously noted, the filter array 510 is an array of pixels 515. The four pixels 515 shown for the filter array 510 may represent a small subset of all the pixels 515 of the filter array 510. The pattern indicated and discussed for the four pixels 515 shown in FIG. 6A may be repeated over the entire array of pixels 515. As shown, every other pixel 515 filters either perpendicular or parallel polarization. That is, each perpendicular polarization filter 610 filters out parallel polarized light 235 resulting from the parallel polarization portion 230 (i.e., passes only perpendicularly polarized light 225) and each parallel polarization filter 620 filters out perpendicularly polarized light 225 resulting from the perpendicular polarization portion 220 (i.e., passes only the parallel polarized light 235).

As previously noted, the filter array 510 may be overlaid on the image sensor 240. Thus, for example, every other pixel 517 of the image sensor 240 only receives perpendicularly polarized light 225 and generates part of the perpendicularly polarized image 520 or only receives parallel polarized light 235 and generates part of the parallel polarized image 530. That is, the perpendicularly polarized image 520 is made up of half of the full array of pixels 517 of the image sensor 240 and the parallel polarized image 530 is made up of the other half of the full array of pixels 517 based on the exemplary filter array 510 shown in FIG. 6A.

FIG. 6B shows a filter pattern of an exemplary filter array 510 used in a depth imaging camera 110 according to one or more embodiments. While the exemplary filter array 510 shown in FIG. 6A pertains to a monochromatic camera, the filter pattern 510 shown in FIG. 6B may be used in a color camera with, for example, the exemplary polarization-coded aperture 210 shown in FIG. 4D. As noted, each pattern of four pixels 515 shown in FIG. 6A results in two types of outputs (i.e., either the perpendicularly polarized light 225 or the parallel polarized light 235 is filtered). However, the pattern of four pixels 515 shown in FIG. 6B, which may be repeated any number of times over the filter array 510, results in four types of outputs, as detailed.

Assuming that only green light is polarized based, for example, on the exemplary polarization-coded aperture 210 shown in FIG. 4D, each perpendicular polarization filter 610 passes through only the perpendicularly polarized light 225, which is green. Each parallel polarization filter 620 passes only parallel polarized light 235, which is also green. These two types of filters are used to obtain the perpendicularly polarized image 520 and the parallel polarized image 530. That is, the perpendicularly polarized image 520 is made up of one-fourth of the full array of pixels 517 of the image sensor 240 and the parallel polarized image 530 is made up of one-fourth of the full array of pixels 517 based on the exemplary filter array 510 shown in FIG. 6B. The blue B filter 630 only passes blue light, and the red R filter 640 only passes red light. The blue light and the red light are unpolarized. Thus, two additional images, one comprised of the blue light B and one comprised of the red light R may be obtained. These images are made up of the other half of the total number of pixels 517 of the image sensor 240. The images may be combined to present a color image to the driver, for example.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A depth imaging system in a vehicle comprising:
    a lens including a polarization-coded aperture, the polarization-coded aperture comprising:
        a perpendicular polarization portion configured to pass incident light from an object as perpendicularly polarized light;
        a parallel polarization portion configured to pass the incident light from the object as parallel polarized light;
    an image sensor configured to provide a perpendicularly polarized image of the object at a first location based on the perpendicularly polarized light and a parallel polarized image of the object at a second location based on the parallel polarized light; and
    a controller configured to determine a difference between the first location of the perpendicularly polarized image and the second location of the parallel polarized image to determine a range to the object.

2. The depth imaging system according to claim 1, wherein the polarization-coded aperture further comprises an obscuration portion configured to block the incident light that encounters the obscuration portion of the polarization-coded aperture.

3. The depth imaging system according to claim 1, further comprising a filter array corresponding with the image sensor, wherein the filter array is a pixelated array of filter pixels, the image sensor is a pixelated array of sensor pixels, and each of the filter pixels corresponds with one of the sensor pixels.

4. The depth imaging system according to claim 3, wherein the filter array is overlaid on the image sensor and is between the polarization-coded aperture and the image sensor.

5. The depth imaging system according to claim 4, wherein the filter pixels are formed as a repeating pattern that includes perpendicularly polarized filters that pass only the perpendicularly polarized light to corresponding ones of the sensor pixels and also includes parallel polarized filters that pass only the parallel polarized light to corresponding ones of the sensor pixels.

6. The depth imaging system according to claim 4, wherein the polarization-coded aperture further comprises a clear portion configured to pass the incident light entering the clear portion of the polarization-coded aperture as red light and blue light.

7. The depth imaging system according to claim 6, wherein the perpendicularly polarized light is green light and the parallel polarized light is green light.

8. The depth imaging system according to claim 7, wherein the filter pixels are formed as a repeating pattern that includes perpendicularly polarized filters that pass only the perpendicularly polarized light that is the green light to corresponding ones of the sensor pixels, parallel polarized filters that pass only the parallel polarized light that is the green light to corresponding ones of the sensor pixels, red filters that pass only the red light to corresponding ones of the sensor pixels, and blue filters that pass only the blue light to corresponding ones of the sensor pixels.

9. The depth imaging system according to claim 8, wherein the image sensor is configured to provide an unpolarized color image based on the red light and the blue light.

10. The depth imaging system according to claim 1, wherein the controller is further configured to control an operation of the vehicle based on the range to each of the one or more objects.

11. A method of assembling a depth imaging system in a vehicle comprising:
    receiving incident light from an object at a lens including a polarization-coded aperture with a perpendicular polarization portion configured to pass incident light as perpendicularly polarized light, and a parallel polarization portion configured to pass the incident light as parallel polarized light;
    receiving the perpendicularly polarized light at a first location of an image sensor to provide a perpendicularly polarized image and receiving the parallel polarized light at a second location of the image sensor to provide a parallel polarized image; and
    determining, at a controller, a difference between the first location of the perpendicularly polarized image and the second location of the parallel polarized image to determine a range to the object.

12. The method according to claim 11, wherein the polarization-coded aperture includes an obscuration portion configured to block the incident light that encounters the obscuration portion of the polarization-coded aperture.

13. The method according to claim 11, further comprising obtaining a filter array corresponding with the image sensor, wherein the filter array is a pixelated array of filter pixels, the image sensor is a pixelated array of sensor pixels, and each of the filter pixels corresponds with one of the sensor pixels.

14. The method according to claim 13, further comprising overlaying the filter array on the image sensor and between the polarization-coded aperture and the image sensor.

15. The method according to claim 14, wherein the obtaining the filter array includes the filter pixels being formed as a repeating pattern that includes perpendicularly polarized filters that pass only the perpendicularly polarized light to corresponding ones of the sensor pixels and also includes parallel polarized filters that pass only the parallel polarized light to corresponding ones of the sensor pixels.

16. The method according to claim 14, wherein the obtaining the polarization-coded aperture further comprises the polarization-coded aperture including a clear portion configured to pass the incident light entering the clear portion of the polarization-coded aperture as red light and blue light.

17. The method according to claim 16, wherein the perpendicularly polarized light is green light and the parallel polarized light is green light.

18. The method according to claim 17, wherein the obtaining the filter array includes the filter pixels being formed as a repeating pattern that includes perpendicularly polarized filters that pass only the perpendicularly polarized light that is the green light to corresponding ones of the sensor pixels, parallel polarized filters that pass only the parallel polarized light that is the green light to corresponding ones of the sensor pixels, red filters that pass only the red light to corresponding ones of the sensor pixels, and blue filters that pass only the blue light to corresponding ones of the sensor pixels.

19. The method according to claim 18, wherein the arranging the image sensor includes configuring the image sensor to provide an unpolarized color image based on the red light and the blue light.

20. The method according to claim 11, wherein the configuring the controller further comprises configuring the controller to control an operation of the vehicle based on the range to each of the one or more objects.

\* \* \* \* \*